United States Patent [19]

Lilly

[11] 4,378,840
[45] Apr. 5, 1983

[54] BIMETALLIC WELL SCREEN USE IN INJECTION WELLS AND METHOD OF MAKING SAME

[75] Inventor: James A. Lilly, Minneapolis, Minn.

[73] Assignee: UOP Inc., Des Plaines, Ill.

[21] Appl. No.: 258,360

[22] Filed: Apr. 28, 1981

[51] Int. Cl.³ .............................................. E21B 43/08
[52] U.S. Cl. .................................................. 166/233
[58] Field of Search ....................... 166/227, 230–234; 29/447

[56] References Cited

U.S. PATENT DOCUMENTS

| | | | |
|---|---|---|---|
| 3,937,281 | 2/1976 | Hornsberger | 166/233 |
| 3,958,634 | 5/1976 | Smith | 166/233 |
| 4,167,972 | 9/1979 | Sears | 166/233 |
| 4,284,138 | 8/1981 | Allred | 166/233 |

FOREIGN PATENT DOCUMENTS 162472  7/1952  Australia ............................. 166/233

Primary Examiner—James A. Leppink
Assistant Examiner—Joseph Falk
Attorney, Agent, or Firm—James R. Hoatson, Jr.; Barry L. Clark; William H. Page, II

[57] ABSTRACT

Mounting arrangement for a bimetallic pipe base well screen which must operate at elevated temperatures utilizes a weld for joining one end of a cylindrical screen member to the outer surface of an internal pipe member which has perforations along a portion of its length underlying the well screen. The opposite end of the screen member, which has a greater temperature coefficient of expansion than the pipe base, has an internal boss or ring portion which, at room temperature, has a smaller inner diameter than the outer diameter of the pipe base. The ring portion is heated and shrunk-fit onto the pipe base to a degree that at operational temperatures it will either expand slightly out of contact with the pipe base, or at least become substantially unstressed, thus preventing damage to the screen member while also blocking out the entry of particles.

2 Claims, 6 Drawing Figures

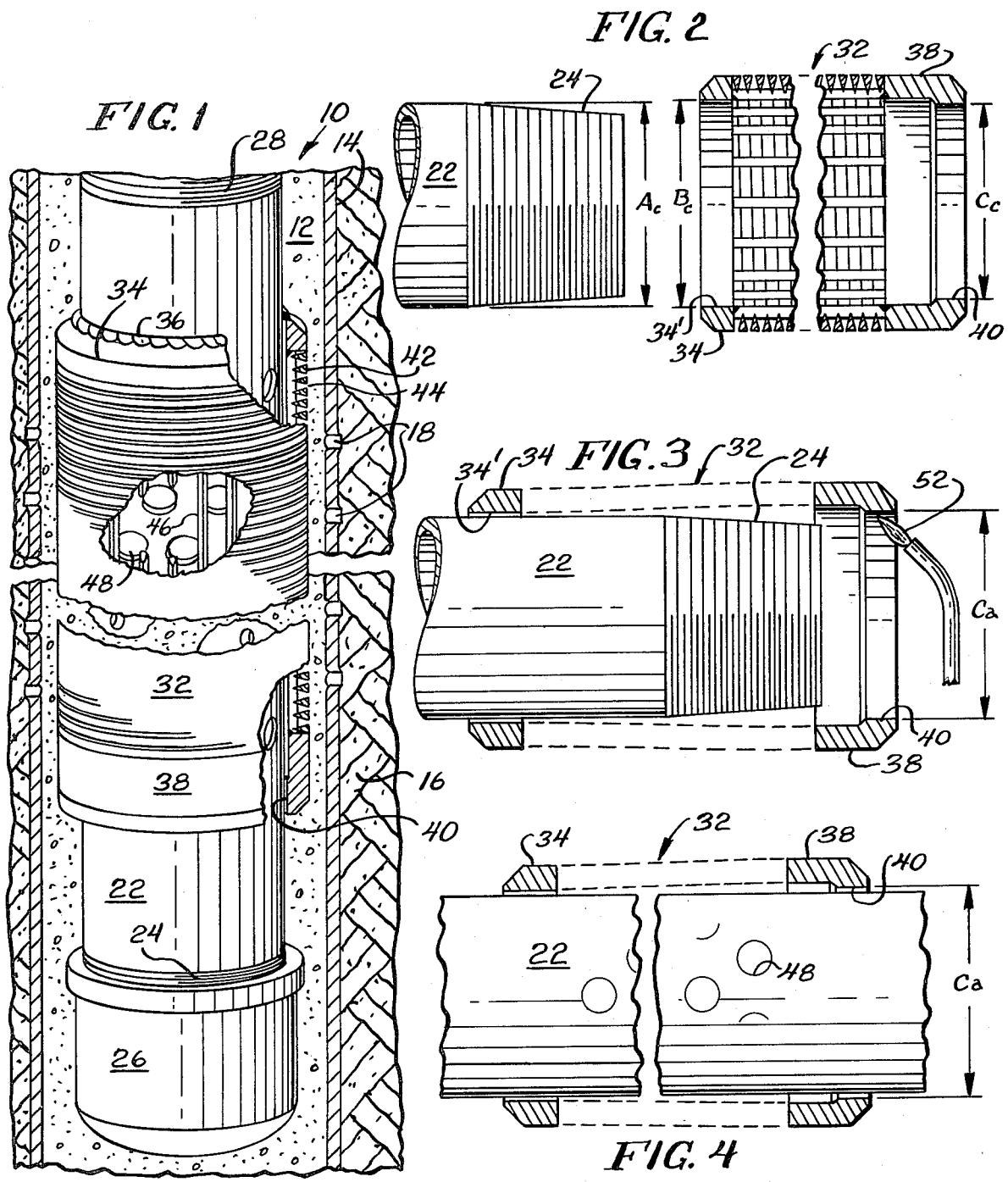

BIMETALLIC WELL SCREEN USE IN INJECTION WELLS AND METHOD OF MAKING SAME

BACKGROUND OF THE INVENTION

The invention relates to well screens and particularly to well screens having a perforated pipe base of the type commonly used in the production of oil and gas. For many years, spiral wound well screens of the type disclosed in Johnson U.S. Pat. No. 2,046,458 have been used in water wells for permitting the passage of water through the surface of the screen and into a pipe connected at the upper end thereof which carries the water to the surface. Wells for the production of water are generally of much shallower depths than those used for the production of oil and gas and there is usually very little cause to withdraw the well pipe and attached screen once the well is completed. The situation is far different in the production of oil and gas since such wells often extend many miles below the surface of the earth. The greater depth of the wells requires that the well screens and pipes have a much greater resistance to compressive, tensile and torsional loading than is the case with water wells. In actual practice, it seems that in more than 50% of the wells drilled that some reason develops for removing a pipe and screen after it has been installed. Since a gravel pack is usually provided around the well screen to provide additional filtering effect, it is usually necessary for very large loads to be applied to lift the pipe string out of the gravel pack. Although the well screens used in such situations, such as the "Super-Weld" screens sold by Johnson Division of UOP Inc., usually have their strength greatly enhanced by being welded at each end to a length of perforated pipe to which they are telescopically attached, it has been found that very large tensile loads can cause the pipe to elongate and break away from the well screen. This type of failure destroys the usefulness of the well screen and opens a large gap between the screen and the underlying pipe perforations through which undesired materials such as sand may enter. The failure may take place even though the pipe usually has a much lower tensile strength per unit of cross-sectional area than does the well screen. The longitudinal rod portions of the well screen are generally made of stainless steel having a generally higher tensile strength than the typical API grade J-55 steel used in the pipe base. However, since the pipe base has a much greater cross-sectional area available to absorb tensile loading than the area of the well screen rods, the pipe base will tend to elongate while the well screen will fail at the juncture of its rods with one of the end support rings.

Failure of a well screen under excess tensile forces can result in displacement of the well screen rods and wrap wire from their usual positions into positions where they can greatly interfere with removal of the pipe from the well or with the attachment of "fishing" tools. Thus, it is preferable to design the well screen so that the integrity of the screen will be preserved and that any failure will take place, not in the screen portion of the assembly, but by a stripping of the threads by which the pipe base of the screen is mounted to the adjoining length of pipe or screen in the pipe string. The thread stripping mode of failure is preferred since it does not interfere with the attachment of "fishing" tools.

A well screen assembly which has the upper end of the screen welded to the pipe base and the lower end free, but sealed relative to the pipe base with an elastomeric ring is disclosed in Sears U.S. Pat. No. 4,167,972 assigned to a common assignee. The disclosed screen overcomes the aforementioned problems, but where the sealing means comprises an elastomeric ring, the seal deteriorates very rapidly at temperatures over about 500° F. The cost of an elastomeric ring and associated construction and labor costs are also quite high.

In addition to the aforementioned causes of tensile stress, an additional cause would be thermal loading due to heating of the pipe and screen assembly. This is commonly a problem when advanced recovery techniques are used such as in steam injection of oil formations. These techniques are increasingly being employed in oil production in order to lower the viscosity of residual oils. Where the screen is welded to the base pipe at each end, the stresses produced in the screen would be compressive due to the increased thermal expansion of the stainless steel screen compared to that of the low carbon steel base pipe. This expansion could lead to failure of the screen by localized buckling. One primary effect of this would be opening of the screen slots causing sand to be pumped. A second primary effect would be to increase the chance that the screen wires or rods would separate and interfere with the ability to retrieve the screen by a "fishing" operation. Presently used steam injection temperatures run from about 500°–650° F. At a temperature of 650° F., the differential expansion of a stainless steel screen relative to a low carbon steel pipe base is about 0.22" per 10' length. Since a screen is typically from 20–40' long, a differential expansion of about 0.44–0.88" would be expected in going from room temperature to 650° F. In the "huff and puff" cycle type of injection operation, steam is injected for perhaps a month to heat the formation to 500°–650° F. and then oil is pumped for several months until its viscosity becomes too high as it cools to perhaps 300° F. This constant cycling between 300° F. and 650° F. would subject a stainless steel screen, which was welded at both ends to a low carbon steel base, to very substantial compression forces which would tend to cause it to buckle.

SUMMARY OF THE INVENTION

It is among the objects of my invention to provide an improved pipe base well screen assembly where the well screen member is mounted to its underlying pipe base member in such a way that excessive loads applied in tension or torsion while removing the screen from a well will not result in damage to the well screen per se. A further object is to provide a bimetallic pipe base well screen assembly which is not only resistant to the temperatures in excess of 500° F. which are present in a steam injection well, but which will retain an effective seal between the screen and pipe base while accommodating movement of the well screen relative to the pipe base caused by a differential in thermal expansion.

The foregoing and other objects are obtained by the improved well screen mounting arrangement of the present invention wherein a section of spiral wrapped well screen is mounted to an underlying perforated pipe base member by means of a pair of cylindrical end rings. The upper end ring is welded to the pipe base in the usual fashion, but the lower ring is somewhat elongated and is positioned at room temperature in a "shrink-fit" relation with an unperforated section of the pipe base member. The rings and well screen are preferably made of stainless steel, while the pipe base is of low carbon steel material which has a temperature coefficient of expansion substantially less than the stainless steel. The lower ring is preferably at room temperatures of a sufficiently smaller inside diameter than the outer diameter of the portion of the pipe base which it is to overlie, that it will firmly engage the pipe base and rigidify the assembly during installation in a well. The degree of overlap should not be so great as to permit the rods in the screen to exceed about 75%, and preferably not more than about 25% of their yield stress as they tend to elongate before the shrink fit ring releases as it is heated in the well. Conversely, the gap between the screen and base pipe should, at the highest expected temperature, not exceed the width of the slots in the screen. Preferably, the gap should be much smaller, such as about 25% of the slot width, so as to minimize the chance that a particle would be able to lodge in the gap.

BRIEF DESCRIPTION OF THE DRAWINGS

FIG. 1 is a partially sectioned, partially broken away perspective view of a well screen assembly showing the relationship between it and the oil bearing formation in which it is positioned;

FIG. 2 is a partially sectioned, partially broken away side view showing the base pipe and screen at room temperature prior to assembly;

FIG. 3 is a partially sectioned, partially broken away side view showing the base pipe and screen during assembly and illustrating the heating of the non-welded end fitting to increase its diameter;

FIG. 4 is a partially sectioned, partially broken away side view showing the base pipe and screen immediately after assembly while the screen fitting is still hot;

FIG. 5 is a partially sectioned, partially broken away side view showing the base pipe and screen after assembly and after the fitting has cooled; and FIG. 6 is an enlarged fragmentary section showing the gap produced between the screen and base pipe at high temperatures in an injection well.

DETAILED DESCRIPTION OF THE PREFERRED EMBODIMENT

Referring to FIG. 1, the improved well screen assembly is indicated generally at 10, and is shown in a typical use environment within a steam injection well wherein temperatures of 500°–650° F. are commonly maintained. The assembly is shown as being surrounded by a gravel pack 12 and positioned within a metal well casing 14 which has been lowered into an oil-bearing formation 16. The casing 14 is typically perforated as shown at 18 by a perforating tool (not shown) which is lowered into the casing. The perforations 18 extend just short of the top and bottom of the screen assembly, depending upon the length of the zone from which oil is to be extracted. The assembly 10 includes a pipe-type support base 22 which is typically made of low carbon steel for purposes of strength and economy. The lower end of the pipe base is threaded as shown in 24 and may be closed off such as by a bull plug 26. An upper threaded end portion 28 is adapted to be coupled to a pipe string (not shown) so that the assembly 10 can be positioned at any desired location below the level of the ground surface. A screen member 32 is mounted on the pipe base 22 by means of an upper end ring 34 which is attached to the pipe base by a weld portion 36. A lower end ring 38 has an inner reduced diameter portion 40 which is generally slightly spaced from the pipe base when the screen assembly is at its operating temperature and is in tight contact with the base when the assembly is lowered into the well casing at relatively cool temperatures. The reason that there is a gap between the inner reduced diameter end portion 40 and the pipe base 22 at high operating temperatures is that the well screen member 32 and its end rings 34, 36 are typically made of stainless steel which has a substantially higher temperature coefficient of expansion than the low carbon steel base pipe 22. The screen member 32 may be conventionally formed of a helically wound tapered wrap wire 42 which is wound and welded so as to form slots or spaces 44. The longitudinal support for the screen is provided by a series of longitudinal rod members 46 which are welded to the end caps 34, 38 and also welded at each of their intersections with the wrap wire 42. The pipe base support member 22 is internally perforated at 48 in the region under the slots 44 so that fluids collected from the formation 16 can be passed upwardly through the support pipe 22 to the surface.

The improved method of assembling the well screen member 32 to the pipe base 22 is illustrated in sequential manner in FIGS. 2 through 5. Referring to FIG. 2, one can see that the pipe base member 22 has an outer diameter at room temperature of a dimension $A_c$. The inner diameter 34' of the upper end ring 34 is preferably dimensioned so as to have an inner diameter $B_c$ at room temperature which is slightly larger than the dimension $A_c$. The inner diameter of the inner ring portion 40 of the lower end ring 38 has a room temperature dimension $C_c$ which is smaller than the pipe dimension $A_c$ so that there would be interference if one tried to assemble the end ring 38 to the pipe base 22.

In FIG. 3, the step of selectively heating the end ring 38, and especially the inner diameter portion 40 by a source of heat 52 is illustrated. The heating may be done in any convenient manner, such as by a torch as shown, or by means of induction heating or by a resistance heater wrapped around the ring 38, to name a few alternatives. When sufficient heat has been applied to increase the diameter of the inner ring portion 40 to a dimension $C_a$ which is greater than $A_c$, the source of heat is removed and the screen member 30 is immediately moved to the left to its desired final position relative to the pipe base 22 as illustrated in FIG. 4. Once in its final position, the end ring 38 will shrink as it is cooled until its inner diameter exactly equals the dimension $A_c$. Since a shrink fit connection will thus be provided between the pipe base 22 and the inner ring portion 40, the opposite end ring 34 can at this point be welded as shown at 36 to the pipe base 22. The compression fit between the end ring 38 and the pipe base will increase the rigidity of the screen assembly 10 as it is lowered into the well. When steam is injected into the well to increase the temperature of the well screen, the end ring will, of course, again expand outwardly relatively to the pipe base 22 and, depending upon the operating temperature of the well and the difference between the dimensions $A_c$ and $C_c$, ring 38 will expand away from the pipe base 22 and produce a gap having a dimension $R_h$.

I claim as my invention:

1. A bimetallic well screen assembly for use in an injection well at elevated temperatures comprising a pipe base member having a perforated portion intermediate its ends and unperforated portions adjacent thereto, a well screen member having a slotted portion overlying said perforated portion and unslotted end ring portions overlying said unperforated portions, said well screen member having a temperature coefficient of expansion which is greater than the temperature coefficient of expansion of the pipe base member, said well screen member having one of said end ring portions welded to the underlying pipe base member, the other of said end ring portions having a radially compressed shrink fit connection to the underlying pipe base member at atmospheric temperatures, but being either slightly out of contact with said pipe base member or at least substantially unstressed at elevated operational temperatures, any spacing between said other end ring and said pipe base member at said elevated operational temperatures being less than the maximum width of the slot openings in the slotted portion of the screen member.

2. A bimetallic well screen assembly in accordance with claim 1 wherein the amount of compression exerted by the other of said end ring portions on said pipe base member is insufficient to permit said well screen member to be compressed beyond 80% of its yield strength as said well screen assembly is brought to any operating temperature up to about 700° F.

* * * * *